United States Patent [19]
Cook et al.

[11] Patent Number: 5,579,741
[45] Date of Patent: Dec. 3, 1996

[54] VAPOR PURGE VALVE HAVING TAPERED BEAD ARMATURE SEAL

[75] Inventors: John E. Cook; Paul Perry; Peter Hueniken, all of Chatham, Canada

[73] Assignee: Siemens Electric Limited, Mississauga, Canada

[21] Appl. No.: 565,704

[22] Filed: Nov. 30, 1995

[51] Int. Cl.$^6$ .......................... F02M 37/04; F16K 31/02
[52] U.S. Cl. .............. 123/516; 251/129.05; 251/129.15; 137/242
[58] Field of Search .................. 123/516, 518, 123/519, 520; 251/129.05, 129.15, 359; 137/242

[56] References Cited

U.S. PATENT DOCUMENTS

| | | | |
|---|---|---|---|
| 3,013,768 | 12/1961 | La Mastra | 251/129.15 |
| 4,235,257 | 11/1980 | Wolf | 137/242 |
| 4,582,294 | 4/1986 | Fargo | 251/129.15 |
| 4,826,132 | 5/1989 | Moldenhauer | 137/242 |
| 4,901,974 | 2/1990 | Cook et al. | 251/129.05 |
| 5,199,456 | 4/1993 | Love et al. | 251/129.15 |
| 5,232,196 | 8/1993 | Hutchings et al. | 251/129.15 |
| 5,237,980 | 8/1993 | Gillier | 251/129.05 |
| 5,326,070 | 7/1994 | Baron | 251/129.05 |

*Primary Examiner*—Thomas N. Moulis

[57] ABSTRACT

A purge valve has a novel seal element on the head end of a reciprocating valve member that features a frustoconical projection for improved noise attenuation and sealing against a flat annular surface of a valve seat. As the projection comes to closed position against the seat surface, it flexes slightly so that the sealing diameter of its rounded free end contracts, to wipe the seat surface. In one embodiment, the seal element is provided with another projection that absorbs impact upon the valve member coming to maximum open position. In another embodiment, an elastomeric damper element is provided on an end of a pole piece of a solenoid assembly to absorb impact of the valve member as it comes to its maximum open position.

26 Claims, 2 Drawing Sheets

VAPOR PURGE VALVE HAVING TAPERED BEAD ARMATURE SEAL

FIELD OF THE INVENTION

This invention relates to a vapor control valve for an on-board evaporative emission control system of an internal combustion engine powered motor vehicle. Such a system typically comprises a vapor collection canister that collects fuel vapor emitted from a tank containing volatile liquid fuel for the engine and a vapor control valve, sometimes referred to as a purge control valve, for periodically purging collected vapor to an intake manifold of the engine.

BACKGROUND AND SUMMARY OF THE INVENTION

Contemporary evaporative emission control systems typically comprise a solenoid-operated purge valve that is under the control of a purge control signal generated by a microprocessor-based engine management system. A typical purge control signal is a duty-cycle modulated pulse waveform having a relatively low frequency, for example in the 5 Hz to 50 Hz range. The modulation may range from 0% to 100%. The reciprocation response of the armature of certain known solenoid-operated purge valves may be sufficiently fast that the armature closely follows the pulse waveform input, especially at lower waveform frequencies. Such pulsating reciprocation may at times produce audible noise that may be deemed objectionable. The noise may even be viewed by the vehicle owner as a potential defect that requires the source of noise to be checked out by a competent service facility, even though the valve is actually operating properly. Such noise may be aggravated at low temperatures in the case of a valve that has an elastomeric seal because such seals typically become stiffer as temperature drops.

Commonly owned U.S. Pat. No. 4,901,974 issued 20 Feb. 1990 shows a canister purge solenoid valve that axially reciprocates in response to a pulsating electrical input. That valve has a sealing means on the end of the armature forming the valve head. This sealing means is designed to impact the seat upon valve closure and also to impact a fixed stop upon the armature coming to its maximum displacement away from the seat (i.e., maximum valve opening). The end of the stator that confronts the end of the armature opposite the armature's head end contains a resilient bumper that is impacted by the armature as the armature comes to its maximum displacement away from the seat so that the armature's impact is shared by both the bumper and a portion of the sealing means as the armature comes to its maximum opening.

A general objective of the present invention is to attenuate audible noise of a purge valve sufficiently that it will be eliminated, or at least attenuated to a level that should not be deemed objectionable, thereby reducing the likelihood that a properly function might be considered to have a noise-producing problem that should be investigated. Moreover, the invention accomplishes this noise-attenuation objective without sacrificing valve performance, and the invention further provides improved sealing of the flow path through the valve when the valve is closed. In exemplary embodiments to be herein disclosed, the portion of the armature that forms the valve head is provided with a novel one-piece seal element having at one axial end that is toward the valve seat, a frustoconically tapered bead forming a seal that flexes slightly as it closes on the valve seat, wiping slightly across the seat as it comes to full closure against the seat surface. In one of the exemplary embodiments, the opposite axial end of the seal element comprises an annular axial wall whose free end comes into abutment with the free end of a confronting annular axial wall fixedly disposed on the valve body as the armature comes to its maximum displacement away from the seat. In another of the exemplary embodiments, a damper is disposed between the axial end of the armature that is opposite the head end, and this damper absorbs impact between the armature and a pole piece of a solenoid's stator as the armature comes to its maximum displacement away from the seat.

The foregoing, along with additional features, and other advantages and benefits of the invention, will be seen in the ensuing description and claims which are accompanied by drawings. The drawings disclose a preferred embodiment of the invention according to the best mode contemplated at this time for carrying out the invention.

DESCRIPTION OF THE PREFERRED EMBODIMENT

Figure 1:
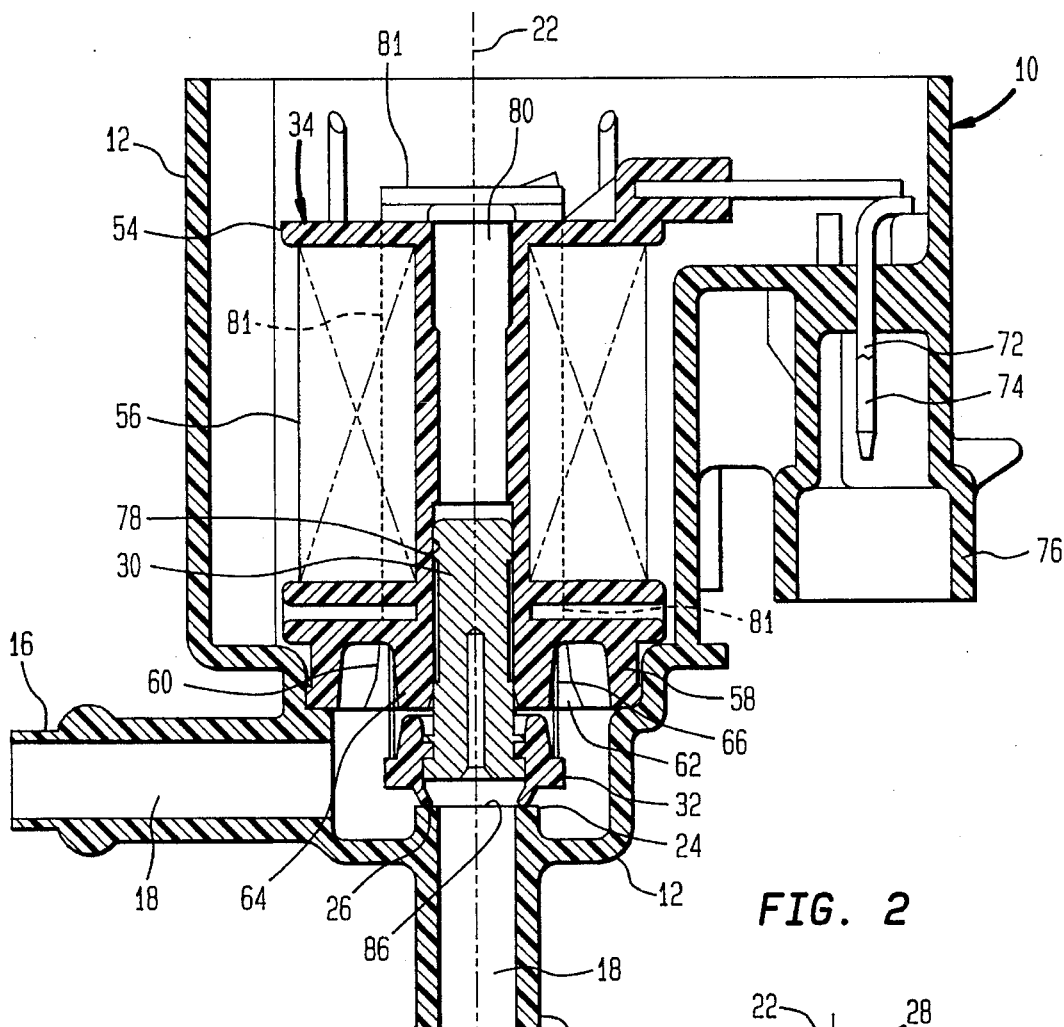
FIG. 1 is a longitudinal cross-sectional view through a first embodiment of canister purge solenoid valve embodying principles of the invention.
Figure 2:
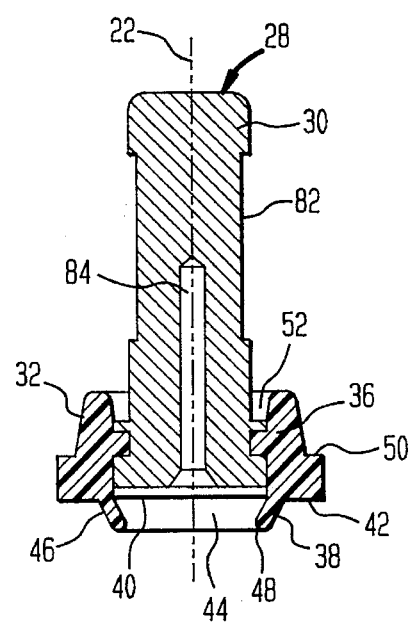
FIG. 2 is an enlarged view of one of the parts of the valve of FIG. 1 by itself, namely an armature assembly.

FIGS. 1 and 2 show a first embodiment 10 of the inventive vapor purge valve that comprises a valve body 12, which further comprises an inlet port 16 in the form of a nipple, an outlet port 14 also in the form of a nipple, and a fluid passage 18 fluid-communicating inlet port 16 and outlet port 14. In an operative on-board evaporative emission control system of an internal combustion engine powered motor vehicle, inlet port 16 is fluid-communicated to a vapor collection canister (not shown) which is in turn fluid communicated to headspace of the vehicle fuel tank (also not shown) to provide for collected fuel vapors to pass from the collection canister to passage 18. Outlet port 14 is fluid-communicated to vacuum developed in the engine intake manifold (also not shown) to provide for fuel vapors to pass from passage 18 to the intake manifold for entrainment with the air-fuel combustion charge entering the engine combustion chamber space.

Body 12 has an imaginary longitudinal axis 22 that is coaxial with outlet port 14. A valve seat 24 is provided within passage 18 circumscribing a through-hole 26, which in this embodiment is shown as an internal termination of inlet port 16.

A valve assembly 28 is disposed internally of body 12 for axial reciprocation along longitudinal axis 22 between a closed position closing through-hole 26, as shown in FIG. 1, and an unseated position opening through-hole 26 to allow fluid communication between ports 16 and 14. Valve assembly 28 comprises a valve member 30 and a one-piece seal element 32 that is disposed on the head end of valve member 30 that is toward valve seat 24. Valve member 30 is ferromagnetic to form the armature of a solenoid assembly 34 that forms part of the actuating mechanism for axially reciprocating valve member 30 in accordance with a purge control signal supplied to valve 10.

Seal element 32 comprises an annular body 36, a portion of which embraces the head end of valve member 30 so that the two are united. Seal element may be formed by molding directly onto valve member 30. The Figures show a circular ridge on the I.D. of seal element 32 fitting into a circular groove in the O.D. of the head end of valve member 30. Seal element 32 further comprises a frustoconical projection 38 that projects from body 36 radially inward coaxial with axis 22 at the axial end of valve member 30 that is toward valve seat 24. A short length of the axial end portion of body 36 that is toward seat 24 does not embrace valve member 30; it comprises an inside diameter surface 40 and an adjoining axial end surface 42 having a slight taper. Frustoconical projection 38 has respective surface portions 44, 46 that merge respectively into surfaces 40, 42. The free end of projection 38 comprises a semi-circularly curved surface 48 extending between surface portions 44, 46.

Seal element 32 further comprises a circumferentially extending ledge 50 bounding body 36, and an annular projection 52 that extends axially from an axial end of body 36 opposite the axial end thereof that is toward valve seat 24. As will be more fully explained later, projection 52 provides an impact damper that is effective as the valve assembly comes to its maximum displacement from seat 24. Solenoid assembly 34 comprises a bobbin 54 on which a length of magnet wire is wound to form the solenoid's coil 56. Bobbin 54 is fixedly secured within body 12 coaxial with axis 22 and comprises an end wall 58 that is toward seal element 32. End wall 58 comprises a spring seat 60 formed by an annular trough 62 having a radially inner annular wall 64. A helical coil spring 66 that forms a portion of the actuating mechanism for reciprocating valve assembly 28 has one axial end seated on spring seat 60 and an opposite axial end bearing against ledge 50 to resiliently bias valve assembly 28 toward its closed position. Wall 64 extends axially partially through a space circumscribed by spring 66 to terminate in a free end which is disposed to be abutted by projection 52 and thereby limit the extent to which valve assembly 28 reciprocates away from valve seat 24.

Solenoid assembly 34 comprises a pair of electrical terminal structures 72, 74 to which the ends of the magnet wire forming coil 56 are joined. The free external ends of terminal structures 72, 74 comprise blades surrounded by a non-electrically conductive shell 76 of body 12 to form a connector for mating connection with a complementary connector (not shown) via which an electrical waveform signal is applied to the solenoid assembly to operate valve 10. The illustrated configuration for structures 72, 74 and shell 76 is representative of one of a number of possibilities that depend on the packaging requirements for any given valve.

Bobbin 54 comprises a circular bore 78 coaxial with axis 22. A ferromagnetic pole piece 80 is fixedly disposed within an upper portion of bore 78 to provide stator structure for a magnetic circuit that includes the upper axial end of ferromagnetic valve member 30. A C-shaped steel strap 81 is fitted onto the exterior of the bobbin for conducting magnetic flux between the head end of pole piece 80 and a location proximate a central portion of valve member 30. A lower portion of bore 78 provides guidance for the axial reciprocation of valve member 30. The O.D. of that portion of valve member 30 that is disposed within bore 78 preferably includes a shallow annular groove 82 to minimize the area of the valve member that is in contact with the wall of the bore, and thereby lessen or minimize friction between the O.D. of the valve member and the bore wall. To further enhance the responsiveness of valve assembly 28, material may be removed from a portion 84 of valve member 30 that is not in the magnetic circuit to lessen its inertial mass. It also appears that the space provided at 84 has an effect on vapor flow rate that provides improved consistency from valve to valve in mass production of valves, although the reason for this is presently unknown.

Valve seat 24 comprises a flat annular seat surface 86 that is perpendicular to axis 22. By making surface 86, and frustoconical projection 38 of sufficiently large diameters for the largest flow rate within a desired range of flow rates through valve 10, the range of axial reciprocation, or the stroke, of valve assembly 28 can be made correspondingly smaller, thereby further reducing the inertial impact of the moving valve assembly at both limits of its range of reciprocation so as to further attenuate noise. The air gap between the lower end face of pole piece 80 and the upper end of valve member 30 can also be made smaller to improve magnetic circuit efficiency.

FIG. 1 shows the closed condition of valve 10 when solenoid assembly 34 is not energized by an electric input signal to coil 56 via terminal structures 72, 74. In this condition, frustoconical projection 38 is flexed slightly from the free shape shown in FIG. 2 to seal against seat surface 86. As coil 56 is increasingly energized by a pulsating electric current waveform, increasing force is exerted on valve assembly 28 urging the valve assembly away from seat surface 86. At a sufficient force, the seal between projection 38 and seat surface 86 is broken, and vapor flows through the valve. Depending on the frequency and duty cycle of the input waveform, the valve assembly reciprocates over various portions of the available range between closed position and maximum open position. Generally speaking, a sufficiently low inertial mass of valve assembly 28 enables the valve assembly to follow the input waveform until the frequency begins to exceed the ability of the valve assembly 28 to follow the waveform. At that point, the valve assembly will tend to oscillate about a position within its range of motion corresponding to the average value of the waveform, with the amplitude of the oscillatory motion about such a position being a function of the waveform frequency. Generally, larger frequencies result in smaller oscillation amplitudes, and vice versa. Whenever the valve assembly 28 comes to maximum open position, projection 52 impacts wall 64, reducing the impact force, and hence impact-caused noise. Whenever the valve assembly is returned toward seat surface 86 by spring 66, projection 38 impacts seat surface 86 and flexes slightly to absorb the impact, reducing the magnitude of the closing impact force, and hence also attenuating impact noise. As the projection flexes slightly from its free shape, its semi-circularly-contoured annular free end 48 wipes slightly across seat surface 86, slightly reducing the sealing diameter and causing a certain beneficial wiping of the seat surface, which helps assure continued effective sealing when the valve assembly is seated on the seat.

Preferably seal element 32 is a fluorocarbon elastomer having a 50–60 durometer, Shore "A" scale. For the size and shape of the disclosed embodiment, this provides suitable rigidity to maintain shape while allowing both projections 38 and 52 to perform their noise-attenuating impact functions, and for projection 38 to wipe seat 24. After the various parts of the valve have been assembled, a suitable potting compound, such as thermoset epoxy resin, is introduced via the open top of body 12 to fill unoccupied internal space so as to encapsulate the top and side of the solenoid, but without intruding into the working parts of the valve and without leaking onto the terminal portions that are surrounded by shell 76.

Figure 3:
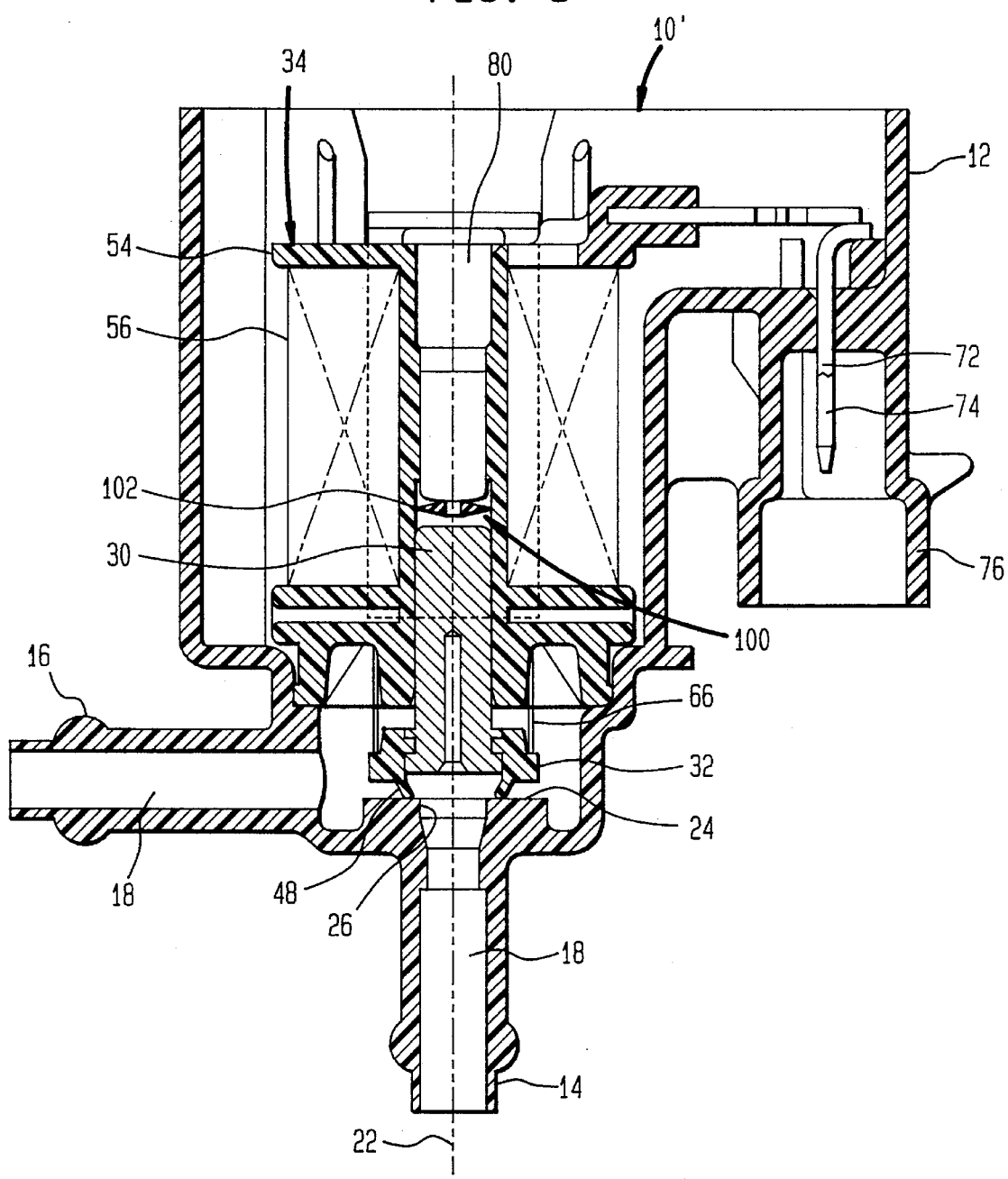
FIG. 3 is a longitudinal cross-sectional view through a second embodiment of canister purge solenoid valve embodying principles of the invention.
Figure 4:
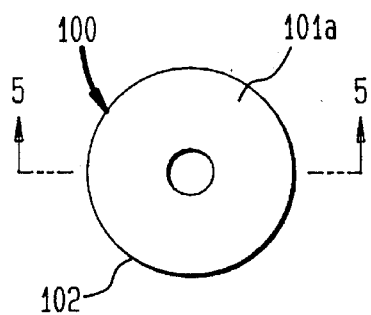
FIG. 4 is a top plan view of one part of the FIG. 3 embodiment shown by itself on an enlarged scale.
Figure 5:
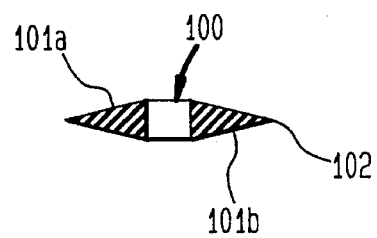
FIG. 5 is a cross-sectional view in the direction of arrows 5—5 in FIG. 4.

FIG. 3 discloses another embodiment 10' of the valve assembly, which is like that of FIGS. 1 and 2 except for the structure by which noise is attenuated when the valve assembly comes to maximum open position. In FIG. 3, the same reference numerals are used to designate the same parts as in FIGS. 1 and 2, and those parts are not redescribed here. The FIG. 3 embodiment replaces the projection 52 of seal element 32 with an elastomeric damper 100. Damper 100 is disposed between the upper end of valve element 30 and the lower end of pole piece 80, specifically being mounted on the lower end of the pole piece. As valve assembly 28 comes to maximum open position, damper 100 absorbs the impact and seal element 32 does not abut wall 64. The design detail of damper 100, which is shown on a larger scale in FIGS. 4 and 5, comprises a ring disposed coaxial with axis 22 and having axial end faces 101a, 101b, that meet at a circular perimeter edge 102. End faces 101a, 101b are frustoconical, and edge 102 is radiused. Material that can provide proper performance over the useful life of the valve assembly should be used for damper 100. One example of such a material is a fluoroelastomer having a 50–60 durometer, Shore "A" scale. One suitable commercial material is Dupont GFLT fluorocarbon elastomer.

While a presently preferred embodiment of the invention has been illustrated and described, it should be appreciated that other embodiments may fall within the scope of the following claims.

What is claimed is:

1. In a vapor collection system for an internal combustion engine fuel system wherein an electrically-operated canister purge valve disposed between an intake manifold of an engine and a fuel vapor collection canister that collects vapor generated by fuel in a fuel tank controls the purging of said canister to said intake manifold in accordance with a purge control signal that sets the extent of purge flow, the improvement in which said canister purge valve comprises:

a valve body comprising an inlet port fluid-communicated to said fuel tank and through which fuel vapors pass from said fuel tank to said valve body, an outlet port fluid-communicated to said intake manifold and through which fuel vapors pass from said valve body to said intake manifold, and a fluid passage in said valve body fluid-communicating said inlet port and said outlet port;

said fluid passage comprising a valve seat having a through-hole that is coaxial with a longitudinal axis of said valve body;

a valve member that is disposed for axial reciprocation along the longitudinal axis between a closed position closing said through-hole and an unseated position opening said through-hole, said valve member comprising a head toward said valve seat;

actuator means for axially reciprocating said valve member in accordance with a purge control signal;

sealing means disposed on one of said valve seat and said valve member's head for sealing therebetween when said valve member is in its closed position;

the other of said valve seat and said valve member's head comprising a flat surface against which said sealing means seals when said valve member is in its closed position;

said sealing means comprising a projection that is coaxial with the longitudinal axis and circumscribes said through-hole when said valve member is in its closed position;

said projection comprising a free end toward said flat surface and comprising a flexible shape that allows flexing from an unflexed free state to a flexed state such that as said valve member comes to its closed position, said free end of said projection engages said flat surface to flex from its unflexed free state and wipe across a portion of said flat surface as said projection flexes from its unflexed free state.

2. The improvement set forth in claim 1 in which said projection is an annular frustoconical projection that flares radially inward in the axial direction that is toward said flat surface.

3. The improvement set forth in claim 1 in which said projection is disposed on said valve member's head, and said flat surface is on said valve seat.

4. The improvement set forth in claim 3 in which said projection is an annular frustoconical projection that flares radially inward in the axial direction that is toward said flat surface.

5. The improvement set forth in claim 4 in which said sealing means comprises a one-piece seal element having an annular body a portion of which embraces said valve member's head, and said annular frustoconical projection projects from said seal element's annular body at an axial end thereof that is toward said flat surface.

6. The improvement set forth in claim 5 in which said axial end of said seal element's annular body does not embrace said valve member's head to thereby space said annular frustoconical projection from said valve member's head.

7. The improvement set forth in claim 6 in which said axial end of said seal element's annular body comprises an inside diameter surface and an adjoining axial end surface, and said annular frustoconical projection has respective surface portions that merge into said inside diameter surface and said adjoining axial end surface of said axial end of said seal element's annular body.

8. The improvement set forth in claim 7 in which said free end of said annular frustoconical projection comprises a curved surface.

9. The improvement set forth in claim 5 in which said annular body of said seal element comprises a circumferentially extending ledge, and said actuator means includes a spring that bears against said ledge to resiliently bias said valve member toward closed position.

10. The improvement set forth in claim 9 in which said spring is a helical coil spring that has one axial end bearing against said ledge, and including a spring seat fixedly disposed on said valve body and against which another axial end of said spring bears, said spring seat comprising a wall that extends axially partially through a space circumscribed by said helical coil spring to terminate in a free end, and said seal element comprises a stop that is disposed to abut said free end of said wall and limit the extent to which said valve member can be reciprocated away from said flat surface of said valve seat.

11. The improvement set forth in claim 10 in which said wall is annular in shape about the longitudinal axis and said stop comprises an annular projection of said seal element that extends axially from said main body of said seal element from an axial end of said main body of said seal element opposite said axial end thereof that is toward said flat surface.

12. The improvement set forth in claim 5 in which said valve member is ferromagnetic and said seal element is fluorocarbon elastomer.

13. The improvement set forth in claim 1 in which said actuator means for axially reciprocating said valve member in accordance with a control signal supplied to the valve comprises a solenoid, said valve member is ferromagnetic and forms the armature of said solenoid, said solenoid comprises a pole piece having an axial end confronting an axial end of said valve member opposite said head end thereof, and including an elastomeric damper element that is disposed on said axial end of said pole piece to be abutted by said axial end of said valve member opposite said head end thereof and limit the extent to which said valve member can be reciprocated away from said flat surface of said valve seat, wherein said elastomeric damper element comprises a ring having frustoconical axial end faces that meet at a radiused circular perimeter edge.

14. A vapor control valve comprising:
- a valve body comprising an inlet port through which vapor enters said valve body, an outlet port through which vapor exits said valve body, and a vapor passage in said valve body communicating said inlet port and said outlet port;
- said vapor passage comprising a valve seat having a through-hole that is coaxial with an imaginary longitudinal axis of said valve body;
- a valve member that is disposed for axial reciprocation along the longitudinal axis between a closed position closing said through-hole and an unseated position opening said through-hole, said valve member comprising a head toward said valve seat;
- actuator means for axially reciprocating said valve member in accordance with a control signal supplied to the valve;
- sealing means disposed on one of said valve seat and said valve member's head for sealing therebetween when said valve member is in closed position;
- the other of said valve seat and said valve member's head comprising a flat surface against which said sealing means seals when said valve member is in closed position;
- said sealing means comprising an annular frustoconical projection that is coaxial with the longitudinal axis and circumscribes said through-hole when said valve member is in closed position;
- said annular frustoconical projection comprising a free end toward said flat surface and comprising a flexible resilient shape that allows flexing from an unflexed free state to a flexed state such that as said valve member comes to closed position, said free end of said projection engages said flat surface and flexes slightly from its unflexed free state to seal against said flat surface.

15. A valve as set forth in claim 14 in which said annular frustoconical projection flares radially inward in the axial direction that is toward said flat surface.

16. A valve as set forth in claim 14 in which said annular frustoconical projection is disposed on said valve member's head, and said flat surface is on said valve seat.

17. A valve as set forth in claim 16 in which said annular frustoconical projection flares radially inward in the axial direction that is toward said flat surface.

18. A valve as set forth in claim 17 in which said sealing means comprises a one-piece seal element having an annular body a portion of which embraces said valve member's head, and said annular frustoconical projection projects from said seal element's annular body at an axial end thereof that is toward said flat surface.

19. A valve as set forth in claim 18 in which said axial end of said seal element's annular body does not embrace said valve member's head to thereby space said annular frustoconical projection from said valve member's head.

20. A valve as set forth in claim 19 in which said axial end of said seal element's annular body comprises an inside diameter surface and an adjoining axial end surface, said annular frustoconical projection has respective surface portions that merge into said inside diameter surface and said adjoining axial end surface of said axial end of said seal element's annular body, and in which said free end of said annular frustoconical projection comprises a curved surface.

21. A valve as set forth in claim 18 in which said annular body of said seal element comprises a circumferentially extending ledge, said actuator means includes a spring that bears against said ledge to resiliently bias said valve member toward closed position, said spring is a helical coil spring that has one axial end bearing against said ledge, and including a spring seat fixedly disposed on said valve body and against which another axial end of said spring bears, said spring seat comprising a wall that extends axially partially through a space circumscribed by said helical coil spring to terminate in a free end, and said seal element comprises a stop that is disposed to abut said free end of said wall and limit the extent to which said valve member can be reciprocated away from said flat surface of said valve seat.

22. A valve as set forth in claim 21 in which said wall is annular in shape about the longitudinal axis and said stop comprises an annular projection of said seal element that extends axially from said main body of said seal element from an axial end of said main body of said seal element opposite said axial end thereof that is toward said flat surface.

23. A valve as set forth in claim 14 in which said actuator means for axially reciprocating said valve member in accordance with a control signal supplied to the valve comprises a solenoid, said valve member is ferromagnetic and forms the armature of said solenoid, and said seal element is fluorocarbon elastomer.

24. A vapor control valve comprising:
- a valve body comprising an inlet port through which vapor enters said valve body, an outlet port through which vapor exits said valve body, and a vapor passage in said valve body communicating said inlet port and said outlet port;
- said vapor passage comprising a valve seat having a through-hole that is coaxial with an imaginary longitudinal axis of said valve body;
- a valve member that is disposed for axial reciprocation along the longitudinal axis between a closed position closing said through-hole and an unseated position opening said through-hole, said valve member comprising a head toward said valve seat;
- actuator means, including a helical coil spring, for axially reciprocating said valve member;
- sealing means disposed on said valve member's head;
- said valve seat comprising a seat surface against which said sealing means seals when said valve member is in closed position;
- said sealing means comprising a sealing surface that seals against said seat surface to close said through-hole when said valve member is in closed position;
- a spring seat fixedly disposed on said valve body;
- said sealing means comprising a circumferentially extending ledge;

a helical coil spring having one axial end that seats on said ledge and another axial end that seats on said spring seat to resiliently bias said valve member toward closed position;

said spring seat comprising a wall that extends axially partially through a space circumscribed by said helical coil spring to terminate in a free end, and said sealing means comprises a stop that is disposed to abut said free end of said wall and limit the extent to which said valve member can be reciprocated away from said seat surface of said valve seat.

25. A valve as set forth in claim 24 in which said seat surface is a flat annular surface transverse to the longitudinal axis, said sealing means comprises a one-piece fluorocarbon rubber seal element containing said sealing surface, said stop, and said ledge, said sealing means comprising an annular body a radially inner portion of which embraces said valve member's head and a radially outer portion of which contains said ledge, an annular frustoconical projection that projects from said seal element's annular body at an axial end thereof that is toward said flat surface and that contains said sealing surface at a free end thereof, and an annular axial wall extending from another axial end of said annular body opposite said annular frustoconical projection to form said stop.

26. In a vapor collection system for an internal combustion engine fuel system wherein an electrically-operated canister purge valve disposed between an intake manifold of an engine and a fuel vapor collection canister that collects vapor generated by fuel in a fuel tank controls the purging of said canister to said intake manifold in accordance with a purge control signal that sets the extent of purge flow, the improvement in which said canister purge valve comprises:

a valve body comprising an inlet port fluid-communicated to said fuel tank and through which fuel vapors pass from said fuel tank to said valve body, an outlet port fluid-communicated to said intake manifold and through which fuel vapors pass from said valve body to said intake manifold, and a fluid passage in said valve body fluid-communicating said inlet port and said outlet port;

said fluid passage comprising a valve seat having a through-hole that is coaxial with a longitudinal axis of said valve body;

a valve member that is disposed for axial reciprocation along the longitudinal axis between a closed position closing said through-hole and an unseated position opening said through-hole, said valve member comprising a head toward said valve seat;

actuator means for axially reciprocating said valve member in accordance with a purge control signal;

sealing means disposed on one of said valve seat and said valve member's head for sealing therebetween when said valve member is in its closed position;

the other of said valve seat and said valve member's head comprising a surface against which said sealing means seals when said valve member is in its closed position;

said actuator means comprises a solenoid, said valve member is ferromagnetic and forms the armature of said solenoid, said solenoid comprises a pole piece having an axial end confronting an axial end of said valve member opposite said head end thereof, and including an elastomeric damper element that is disposed on said axial end of said pole piece to be abutted by said axial end of said valve member opposite said head end thereof and limit the extent to which said valve member can be reciprocated away from said surface of said valve seat, wherein said elastomeric damper element comprises a ring having frustoconical axial end faces that meet at a radiused circular perimeter edge.

* * * * *